United States Patent
Cherian et al.

(10) Patent No.: US 9,125,087 B2
(45) Date of Patent: Sep. 1, 2015

(54) SYSTEMS AND METHODS FOR HEADER COMPRESSION

(71) Applicant: QUALCOMM Incorporated, San Diego, CA (US)

(72) Inventors: George Cherian, San Diego, CA (US); Santosh Paul Abraham, San Diego, CA (US); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 13/656,249

(22) Filed: Oct. 19, 2012

(65) Prior Publication Data

US 2013/0100886 A1    Apr. 25, 2013

Related U.S. Application Data

(60) Provisional application No. 61/550,388, filed on Oct. 22, 2011.

(51) Int. Cl.
*H04W 4/00* (2009.01)
*H04W 28/06* (2009.01)

(52) U.S. Cl.
CPC .................................... *H04W 28/06* (2013.01)

(58) Field of Classification Search
CPC ..... H04W 80/04; H04W 88/06; H04W 88/08; H04W 84/18; H04L 29/06
USPC ................ 370/328; 455/422.1–460, 524–525
See application file for complete search history.

(56) References Cited

U.S. PATENT DOCUMENTS

| | | | |
|---|---|---|---|
| 6,967,964 B1 | 11/2005 | Svanbro et al. | |
| 7,031,666 B2 | 4/2006 | Hsu | |
| 7,266,105 B2 * | 9/2007 | Wu | 370/338 |
| 7,450,547 B2 * | 11/2008 | Kim et al. | 370/331 |
| 7,609,726 B2 * | 10/2009 | Hans et al. | 370/474 |
| 7,948,913 B1 | 5/2011 | Dinan | |
| 2003/0179713 A1 | 9/2003 | Fleming | |
| 2004/0165585 A1 | 8/2004 | Imura et al. | |
| 2007/0019674 A1 * | 1/2007 | Bourlas et al. | 370/466 |
| 2010/0177736 A1 * | 7/2010 | Wang et al. | 370/331 |
| 2010/0208655 A1 * | 8/2010 | Kim et al. | 370/328 |
| 2011/0058540 A1 | 3/2011 | Bunn et al. | |

(Continued)

FOREIGN PATENT DOCUMENTS

KR    20090012019 A    2/2009

OTHER PUBLICATIONS

IEEE Std 802.11-2007.*

(Continued)

*Primary Examiner* — Mark Rinehart
*Assistant Examiner* — Peter Solinsky
(74) *Attorney, Agent, or Firm* — James K. O'Hare

(57) ABSTRACT

Systems, methods, and devices for communicating packets having a plurality of types are described herein. In some aspects, the packets include a compressed header. In one embodiment, a compression protocol is selected from a plurality of compression protocols to compress a first packet header. The packet may contain a second packet header, which may include information indicative of the compression protocol used to compress the first packet header. The packet may be transmitted, including the first packet header which is compressed using the selected compression protocol.

26 Claims, 7 Drawing Sheets

(56) References Cited

U.S. PATENT DOCUMENTS

| | | | |
|---|---|---|---|
| 2011/0122893 A1* | 5/2011 | Kang et al. | 370/477 |
| 2011/0131412 A1 | 6/2011 | Grimsley et al. | |
| 2011/0249610 A1 | 10/2011 | Ho et al. | |
| 2011/0263221 A1* | 10/2011 | Yi et al. | 455/410 |
| 2012/0002596 A1* | 1/2012 | Kim et al. | 370/315 |
| 2013/0301629 A1* | 11/2013 | Sugaya | 370/338 |
| 2014/0093076 A1* | 4/2014 | Liikanen et al. | 380/255 |

OTHER PUBLICATIONS

IETF RFC2507, Feb. 1999.*
IETF RFC3095, Jul. 2001.*
3GPP TS 25.323 Version 9.1.0 Release 9, Oct. 2010.*
3GPP TSG GERAN Adhoc #2, Tdoc 0058/00, Oct. 2000.*
International Search Report and Written Opinion—PCT/US2012/061347—ISA/EPO—Jan. 31, 2013.

\* cited by examiner

SYSTEMS AND METHODS FOR HEADER COMPRESSION

CROSS-REFERENCE TO RELATED APPLICATIONS

This application claims benefit under 35 U.S.C. §119(e) to U.S. Provisional Patent Application No. 61/550,388 entitled "SYSTEMS AND METHODS FOR HEADER COMPRESSION" filed on Oct. 22, 2011, the disclosure of which is hereby incorporated by reference in its entirety.

FIELD

The present application relates generally to wireless communications, and more specifically to systems, methods, and devices for compressing headers for communication.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units or data frames. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

Accordingly, the header information is transmitted with packets. Such header information may comprise a large portion of a data packet. Accordingly, transmission of data in such packets may be inefficient due to the fact that much of the bandwidth for transmitting data may be used to transmit header information as opposed to the actual data. Thus, improved systems, methods, and devices for communicating packets are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include allowing the use of compressed headers for packets, thereby reducing the overhead in transmitting payloads in data packets.

One aspect of this disclosure provides a method of communicating in a wireless network. The method comprises selecting, at a first apparatus, at least one compression protocol from a plurality of compression protocols to use for compressing a first header of a data packet communicated between the first apparatus and a second apparatus. The method comprises transmitting information indicative of the at least one compression protocol from the first apparatus to the second apparatus, the information included in a second header of the data packet. The method comprises transmitting the data packet, compressed based on the at least one compression protocol, from the first apparatus to the second apparatus.

Another aspect of this disclosure provides a first apparatus for communicating in a wireless network. The first apparatus comprises a processor configured to select at least one compression protocol from a plurality of compression protocols to use for compressing a first header of a data packet communicated between the first apparatus and a second apparatus. The first apparatus comprises a transmitter. The transmitter is configured to transmit information indicative of the at least one compression protocol to the second apparatus, the information included in a second header of the data packet. The transmitter is configured to transmit the data packet, compressed based on the at least one compression protocol, to the second apparatus.

Another aspect of this disclosure provides a first apparatus for communicating in a wireless network. The first apparatus comprises means for selecting at least one compression protocol from a plurality of compression protocols to use for compressing a first header of a data packet communicated between the first apparatus and a second apparatus. The first apparatus comprises means for transmitting information indicative of the at least one compression protocol from the first apparatus to the second apparatus, the information included in a second header of the data packet. The first apparatus comprises means for transmitting the data packet, compressed based on the at least one compression protocol, from the first apparatus to the second apparatus.

Another aspect of this disclosure provides a computer readable medium comprising instructions. The instructions when executed cause a first apparatus to select, at the first apparatus, at least one compression protocol from a plurality of compression protocols to use for compressing a first header of a data packet communicated between the first apparatus and a second apparatus. The instructions when executed cause the first apparatus to transmit information indicative of the at least one compression protocol from the first apparatus to the second apparatus, the information included in a second header of the data packet. The instructions when executed cause the first apparatus to transmit the data packet, compressed based on the at least one compression protocol, from the first apparatus to the second apparatus.

DETAILED DESCRIPTION

Figure 1:
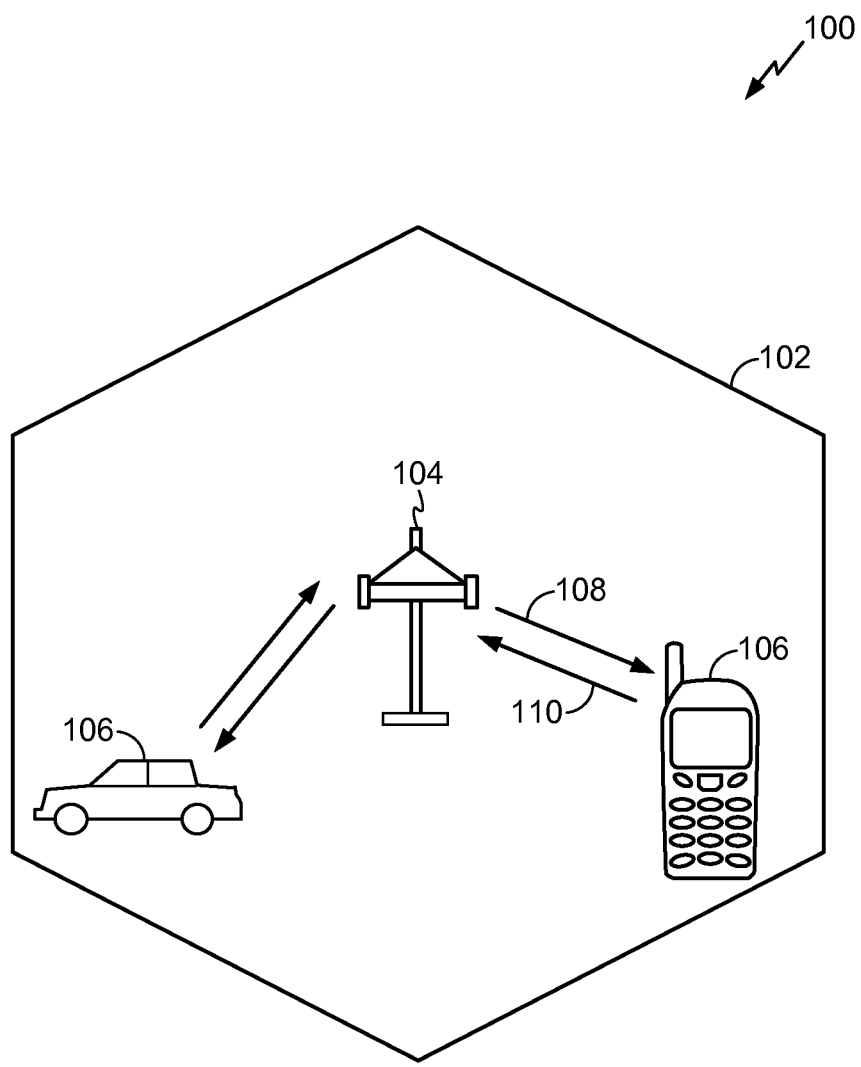
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct—sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAB"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may provide wireless communication coverage in a basic service area (BSA) 102. It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
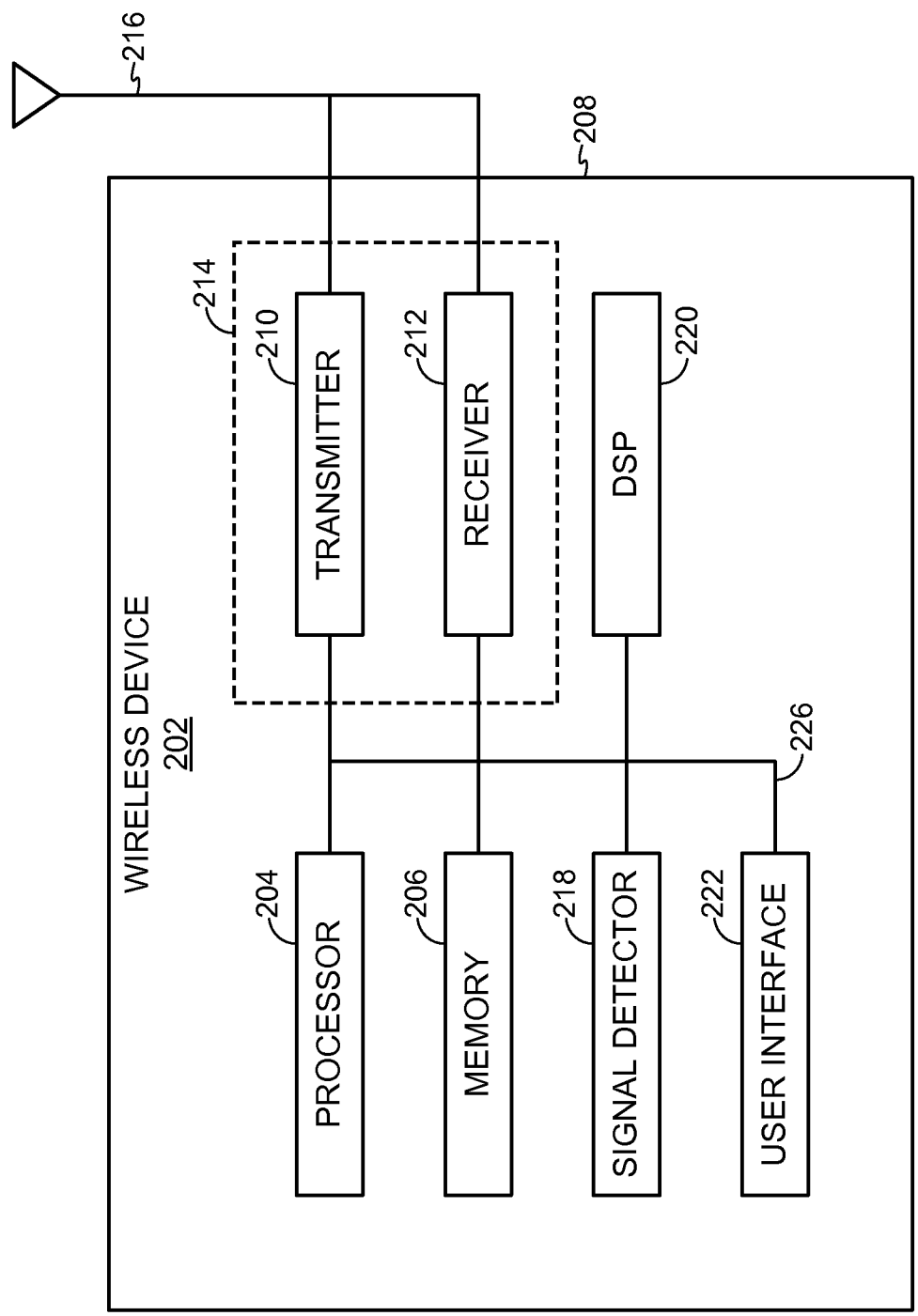
FIG. 2 illustrates various components, including a receiver, that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

When the wireless device 202 is implemented or used as a transmitting node, the processor 204 may be configured to select one of a plurality compression protocols for compressing headers, and to generate a packet having a compressed header associated with the selected compression protocol. Further, the processor 204 may generate and/or process request messages and/or response messages for negotiating use of a particular compression protocol with another wireless device.

When the wireless device 202 is implemented or used as a receiving node, the processor 204 may be configured to receive and process packets having compressed headers. Further, the processor 204 may generate and/or process request messages and/or response messages for negotiating use of a particular compression protocol with another wireless device.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit request messages and/or response messages for negotiating use of a particular compression protocol with another wireless device. Further, the transmitter 210 may be configured to wirelessly transmit packets having compressed headers.

The receiver 212 may be configured to wirelessly receive request messages and/or response messages for negotiating use of a particular compression protocol with another wireless device. Further, the transmitter 210 may be configured to wirelessly receive packets having compressed headers.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

For ease of reference, when the wireless device 202 is configured as a transmitting node, it is hereinafter referred to as a wireless device 202t. Similarly, when the wireless device 202 is configured as a receiving node, it is hereinafter referred to as a wireless device 202r. A device in the wireless communication system 100 may implement only functionality of a transmitting node, only functionality of a receiving node, or functionality of both a transmitting node and a receive node.

As discussed above, the wireless device 202 may comprise an AP 104 or an STA 106, and may be used to transmit and/or receive communications having a plurality of MAC header types.

As discussed above, a wireless device 202t may communicate with a wireless device 202r. For example, the wireless device 202t may transmit data packets to the wireless device 202r. The wireless device 202t may be configured to transmit data packets of different types. In particular, the data packets may utilize an uncompressed header or a compressed header. The compressed header may be one of a plurality of types of compressed headers. Each header may be defined based on one of a plurality of compression protocols discussed further herein (e.g., an uncompressed protocol, a robust header compression (ROHC) over WiFi protocol, a flow based header compression protocol, a modified 6LoWPAN for WiFi protocol, etc.). Accordingly, for the wireless device 202r to properly decode data packets transmitted by the wireless device 202t, the wireless device 202r may need to determine which compression protocol the wireless device 202t used in generating the header for the data packet (i.e., what type of header is in the data packet). In one aspect, in order to implement the compression protocols a compression layer is defined that is above the media access control (MAC) layer of the open systems interconnection (OSI) model used for communication. For example, the OSI model defines a hierarchy of layers starting at a lowest layer to a highest layer (i.e., a physical layer, a data link layer, a network layer, a transport layer, a session layer, a presentation layer, and an application layer). The MAC layer is a sublayer of the data link layer. Accordingly, the compression layer may be defined as a new layer or a sublayer that is above the MAC layer in the hierarch of layers. Accordingly, the compression layer specifies which compression protocol is to be used for a data packet, and the elements that are included in the compressed header.

In one aspect, the device 202t and the device 202r may negotiate the use of a particular compression protocol for data packets communicated between the device 202t and the device 202r. The devices 202t and 202r may negotiate by exchanging messages or signaling between each other that indicates the compression protocol to be used. In one aspect, such message exchange or signaling may occur at the MAC layer by defining mechanisms at the MAC layer (e.g., a 802.11 MAC layer).

In some aspects, the message exchange or signaling may occur through transmission of an information element. The information element may comprise one or more bits. The value of the information element may indicate which compression protocol(s) are to be used and/or parameters of the compression protocol. The device receiving the information element may further acknowledge receipt of the information element and use of the compression protocol(s) as defined by the information element.

Parameters may include header information that is static or semi static (e.g., does not change often) from one packet to another communicated between the wireless devices 202t and 202r. Accordingly, such header information may be exchanged and stored at each of the devices and used for decoding data packets having compressed headers. The compressed headers themselves may have only information that changes often. The information from the compressed header of the data packet may be used with the static or semi-static header information received in the message exchange or signaling to decode data packets.

In one aspect, the information element is transmitted from the wireless device 202t to the wireless device 202r and indicates which compression protocols are used for transmissions from the wireless device 202t to the wireless device 202r, but not from the wireless device 202r to the wireless device 202t. Further, the wireless device 202r may send a message acknowledging receipt of the information element and use of the compression protocol(s) as defined by the information element. In such an aspect, the wireless device 202r may transmit another information element to the wireless device 202t that indicates which compression protocols are used for transmissions from the wireless device 202r to the wireless device 202t. Further, the wireless device 202t may send a message acknowledging receipt of the information element and use of the compression protocol(s) as defined by the information element.

In another aspect, the information element is transmitted from the wireless device 202t to the wireless device 202r and indicates which compression protocols are used for transmissions from the wireless device 202t to the wireless device 202r and which compression protocols are used for transmissions from the wireless device 202r to the wireless device 202t. In such an aspect, the transmission in both directions may define use of the compression protocols in the same manner. Further, the wireless device 202r may send a message acknowledging receipt of the information element and use of the compression protocol(s) as defined by the information element.

In some aspects, the information element may be sent from the wireless device 202t to the wireless device 202r in a management frame. In one aspect, the information element may be sent as part of an existing management frame such as a MAC header. In another aspect, the information element may be sent in a new management frame, such as a compression request management frame. Further, the wireless device 202r may send a message acknowledging receipt of the information element and use of the compression protocol(s) as defined by the information element. For example, the acknowledgement may be sent in a new management frame, such as a compression response management frame.

As discussed above, the message exchange or signaling may indicate which compression protocol(s) are to be used and/or parameters of the compression protocol. For example, the message exchange or signaling may indicate (inherently or explicitly) that one compression protocol is to be used for all communications from the wireless device 202t to the wireless device 202r and/or vice versa. Accordingly, a device receiving packets after the message exchange or signaling is aware that the packets use the one compression protocol without further signaling.

In another example, the message exchange or signaling may indicate (inherently or explicitly) that different compression protocols are to be used for different packets communicated from the wireless device 202t to the wireless device 202r and/or vice versa. Accordingly, the device receiving the packets after the message exchange or signaling may look for an indicator in the packet that identifies which compression protocol is used for the packet. For example, different values of the indicator may be associated with different communication protocols. The mapping of the indicator values to the communication protocols may be inherently known by the devices (e.g., pre-programmed). Alternatively or additionally, the mapping of the indicator values to the communication protocols may be explicitly indicated via the message exchange or signaling (e.g., based on the information elements). For example, the compression request management frame and the compression response management frame may be used to setup multiple compression profiles between the wireless device 202t and the wireless device 202r. Each profile may be associated with a different compression protocol and identified by a numeric value. The indicator may therefore have the appropriate numeric value based on the compression protocol used for the data packet.

In some aspects, the indicator may be sent from the wireless device 202t to the wireless device 202r as new values for existing fields in data packets communicated between the wireless device 202t and the wireless device 202r. For example, the indicator may be sent as a new value for an ethertype field included in the logical link control (LLC) header, subnetwork access protocol (SNAP) header, or LLC+SNAP header, of a data packet.

In another example, the indicator may be sent as a new value for a field included in the MAC header of a data packet. In another example, a new service access point is defined for the compression protocol to be used and the indicator comprises a new value in the subnetwork access protocol (SNAP) header in the LLC+SNAP header.

Figure 7:
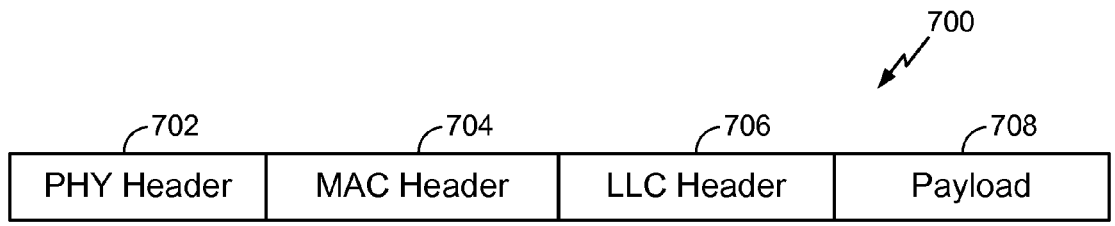
FIG. 7 illustrates an exemplary packet structure for a data packet.

FIG. 7 illustrates an exemplary packet structure for a data packet 700. The data packet 700 comprises a physical layer (PHY) header 702, a MAC header 704, an LLC (which may be an LLC+SNAP) header 706, and a payload 708. In one aspect, the indicator may be sent as a new value for an ethertype field of the LLC header 706.

Figure 8:
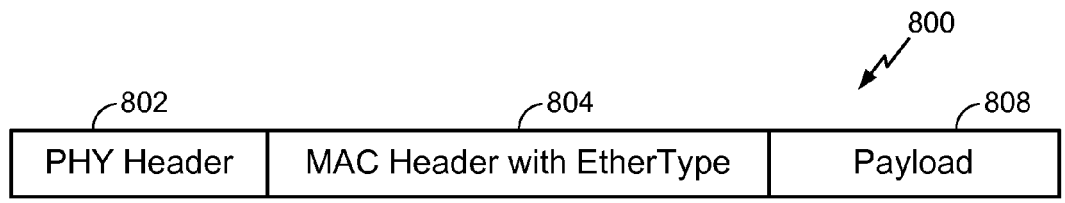
FIG. 8 illustrates an exemplary packet structure for a data packet.

FIG. 8 illustrates an exemplary packet structure for a data packet 800. The data packet 800 comprises a physical layer (PHY) header 802, a MAC header 804, and a payload 808, but does not include an LLC header. In one aspect, instead of an entire LLC header, an ethertype field may be added to the MAC header 804. The indicator may be sent as a new value for the ethertype field.

Figure 9:
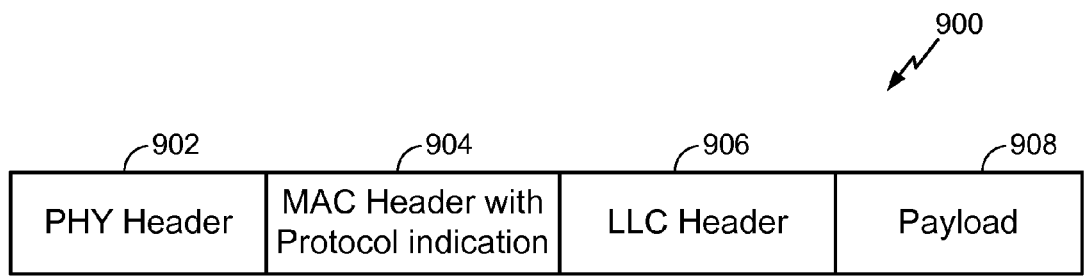
FIG. 9 illustrates an exemplary packet structure for a data packet.

FIG. 9 illustrates an exemplary packet structure for a data packet 900. The data packet 900 comprises a physical layer (PHY) header 902, a MAC header 904, an LLC (which may be an LLC+SNAP) header 906, and a payload 908. In one aspect, the indicator may be sent as a new value for a field in the MAC header 904.

Figure 10:
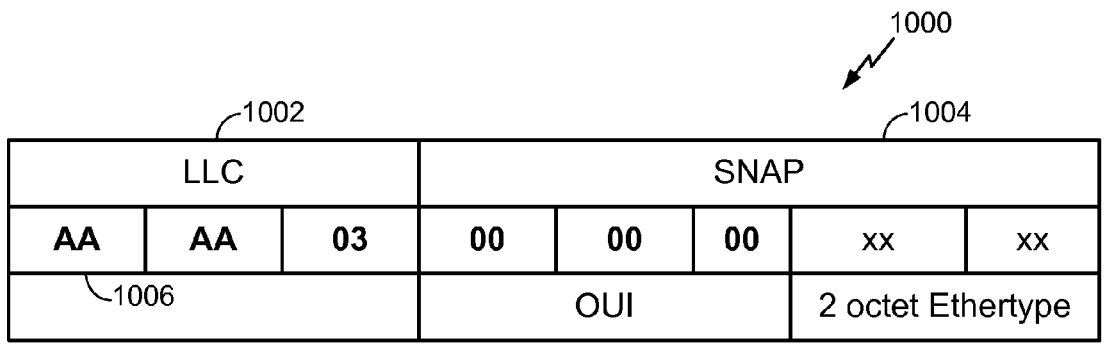
FIG. 10 illustrates an exemplary LLC+SNAP header for a data packet.

FIG. 10 illustrates an exemplary LLC+SNAP header 1000 for a data packet. The LLC+SNAP header 1000 comprises a LLC header 1002 and a SNAP header 1004. The LLC header 1002 comprises three octets 1006. Further, the SNAP header 1004 comprises five octets 1006. The first three octets of the SNAP header 1004 may be a three octet IEEE organizationally unique identifier (OUI). The last 2 octets may be the ethertype field that includes the indicator discussed above In some aspects, there may be more than one session or flow of communication of packets between the wireless device 202t and the wireless device 202r. A different compression protocol may be defined for each of the sessions or flows using the message exchange or signaling discussed above. Further, each session or flow may have an identifier associated with the session or flow (e.g., a bit in a header for data packets of the session or flow, such as a TID). Accordingly, a wireless device 202 receiving a data packet of the particular session or flow can determine the compression protocol used for the data packet is the same as associated with the session or flow.

Various compression protocols that may be used according to the systems and methods described herein are further discussed below.

In one aspect, one compression protocol that can be used according to the systems and methods described herein is a ROHC over WiFi protocol. In the ROHC over WiFi protocol, some parameters may be exchanged during negotiation of use of the ROHC over WiFi protocol between the wireless device 202t and the wireless device 202r. Such parameters may include one or more of the following: IP compression protocol, MAX_CID (indicates the maximum value of a context identifier), MRRU (maximum reconstructed reception unit (the size of the largest reconstructed unit in octets that a decompressor is expected to reassemble from segments)), MAX_HEADER (largest header size in octets that may be compressed, and ROHC profile. The parameters may be exchanged according to negotiation discussed above. In another aspect, existing network discovery protocols (e.g., address resolution protocols) that are performed as part of ROHC setup is used to exchange the parameters, such as by including the parameters in ROHC setup messages. These parameters may therefore not be included in a compressed header for packets transmitted using the ROHC over WiFi protocol. The compressed header may include other information that is used along with the parameters to decode the packets.

In another aspect, another compression protocol that can be used according to the systems and methods described herein is a flow based header compression protocol. In the flow based header compression protocol, semi-static or static parameters may be exchanged during negotiation of use of the flow based header compression protocol between the wireless device 202t and the wireless device 202r. Such semi-static or static parameters may be different for each IP flow (which may be defined by at least a source and destination address for packets of the flow) between the wireless device 202t and the wireless device 202r. Such semi-static or static parameters may include fields from one or more of the following header fields: IPv4, IPv6, TCP, UDP, LLC/SNAP, App headers (e.g., http, etc.). In IPv4, the semi-static or static parameters may include one or more of the following fields: version, internet header length (IHL) differentiated services code point (DSCP), protocol, header checksum, source address, and destination address. In IPv6, the semi-static or static parameters may include one or more of the following fields: version, traffic class, flow label, source address, and destination address. In TCP, the semi-static or static parameters may include one or more of the following fields: source port, destination port, and reserved. In UDP, the semi-static or static parameters may include one or more of the following fields: source port and destination port.

The parameters may be exchanged according to negotiation discussed above. In another aspect, existing network discovery protocols (e.g., address resolution protocols) that are performed as part of setup are used to exchange the parameters, such as by including the parameters in setup messages. These parameters may therefore not be included in a compressed header for packets transmitted using the flow based header compression protocol. The compressed header may include other information (e.g., dynamic fields of the header fields that change between packets more often than the parameters) that is used along with the parameters to decode the packets. In IPv4, the dynamic fields may include one or more of the following fields: explicit congestion notification (ECN), total length, identification, flags, fragment offset, time to live (TTL) and options. In IPv6, the dynamic fields may include one or more of the following fields: payload length, next header, and hop limit. In TCP, the dynamic fields may include one or more of the following fields: control bits, sequence number, acknowledgement number, ECN, data offset, window, and checksum. In UDP, the dynamic fields may include one or more of the following fields: length and checksum.

In another aspect, another compression protocol that can be used according to the systems and methods described herein is a modified 6LoWPAN over WiFi protocol. In the modified 6LoWPAN over WiFi protocol, some parameters may be exchanged during negotiation of use of the modified 6LoW-PAN over WiFi protocol between the wireless device 202t and the wireless device 202r. Other parameters may be inherently known and not exchanged, such as a MAC identifier. The parameters may be exchanged according to negotiation discussed above. In another aspect, existing network discovery protocols (e.g., address resolution protocols) that are performed as part of setup is used to exchange the parameters, such as by including the parameters in setup messages. These parameters may therefore not be included in a compressed header for packets transmitted using the modified 6LoWPAN over WiFi protocol. The compressed header may include other information that is used along with the parameters to decode the packets.

Figure 3:
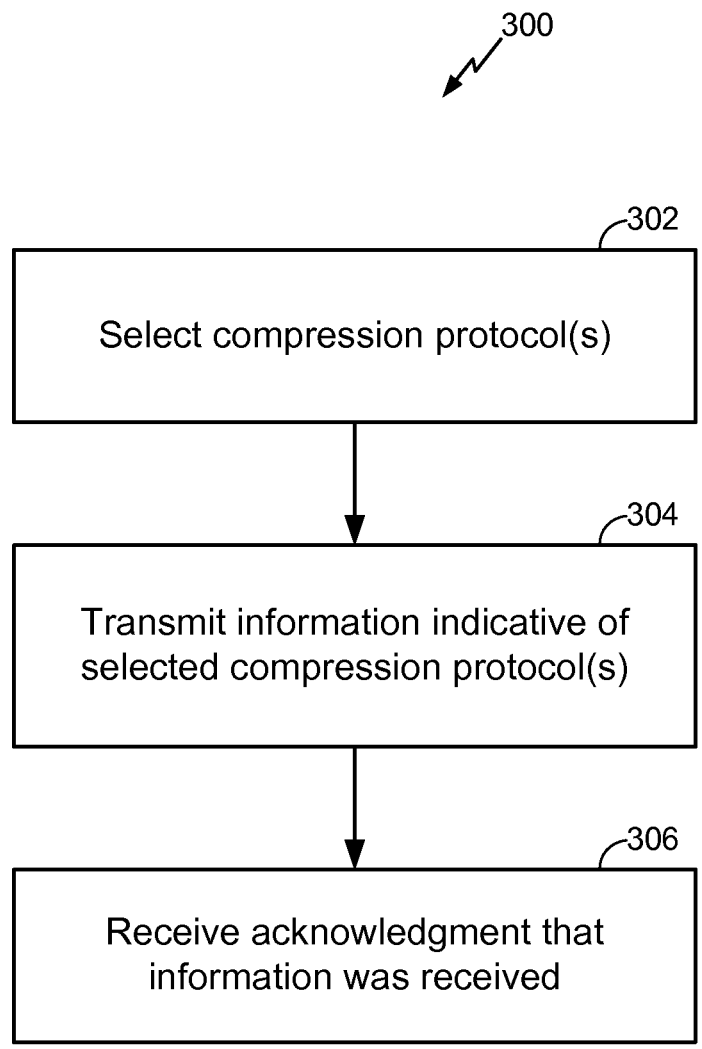
FIG. 3 illustrates an aspect of a method for negotiating use of a compression protocol.

FIG. 3 illustrates an aspect of a method 300 for negotiating use of a compression protocol. The method 300 may be used to negotiate which compression protocol(s) are to be used for particular communications between the wireless device 202t and the wireless device 202r as discussed above. Although the method 300 is described below with respect to elements of the wireless device 202t, those having ordinary skill in the art will appreciate that other components may be used to implement one or more of the steps described herein.

At block 302, the wireless device 202t selects one or more compression protocols to be used for communication between the wireless device 202t and the wireless device 202r. Next, at block 304, the wireless device 202t sends information to the wireless device 202r indicating the selected compression protocol(s). Optionally, along with or separate from the information indicating the selected compression protocol(s), the wireless device 202t sends parameters related to the selected compression protocol(s). Continuing, at a block 306, the wireless device 202r sends and the wireless device 202t receives a response acknowledging receipt of the information and optionally the parameters.

Figure 4:
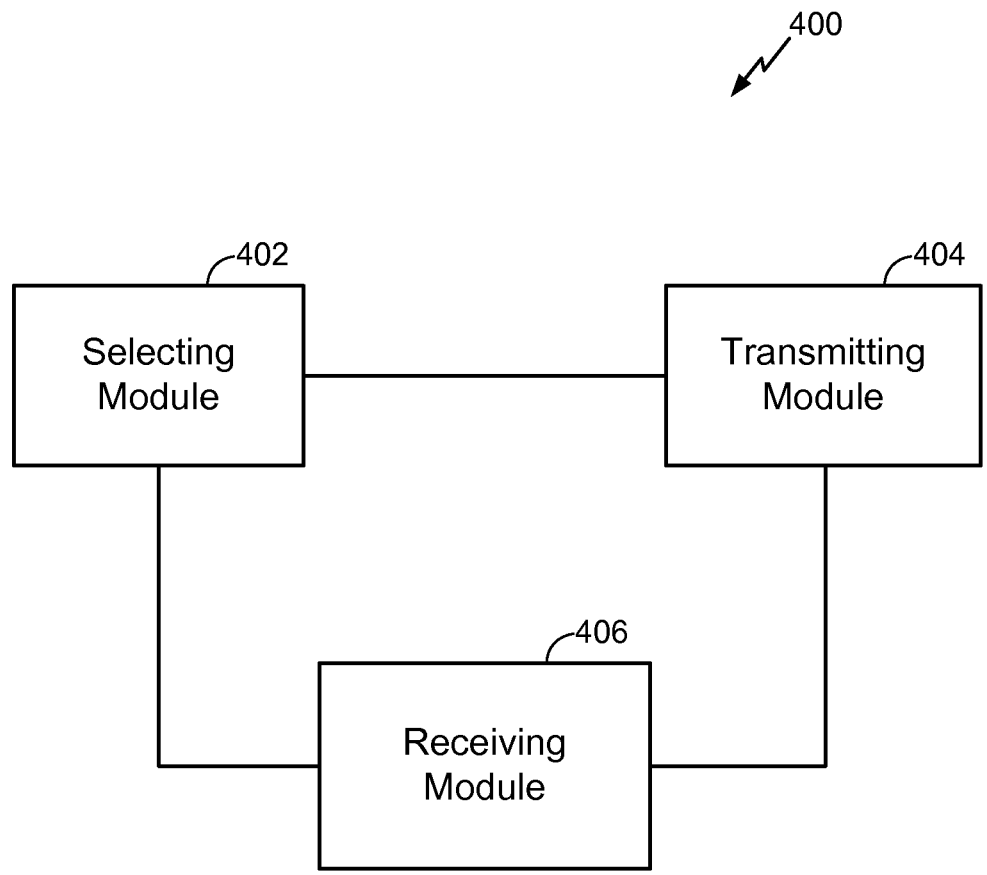
FIG. 4 is a functional block diagram of another exemplary wireless device that may be employed within the wireless communication system.

FIG. 4 is a functional block diagram of another exemplary wireless device 400 that may be employed within the wireless communication system 100. The device 400 comprises a selecting module 402 for selecting the one or more communication protocols to be used for communication between the wireless device 400 and the wireless device 202r. The selecting module 402 may be configured to perform one or more of the functions discussed above with respect to the block 302 illustrated in FIG. 3. The selecting module 402 may correspond to one or more of the processor 204 and the DSP 220. The device 400 further comprises a transmitting module 404 for transmitting information to the wireless device 202r indicating the selected compression protocol(s) and optionally parameters. The transmitting module 404 may be configured to perform one or more of the functions discussed above with respect to the block 304 illustrated in FIG. 3. The transmitting module 404 may correspond to the transmitter 210. The device 400 further comprises a receiving module 406 for a receiving a response acknowledging receipt of the information and optionally the parameters. The receiving module 406 may be configured to perform one or more of the functions discussed above with respect to the block 306 illustrated in FIG. 3. The receiving module 406 may correspond to the receiver 212.

Figure 5:
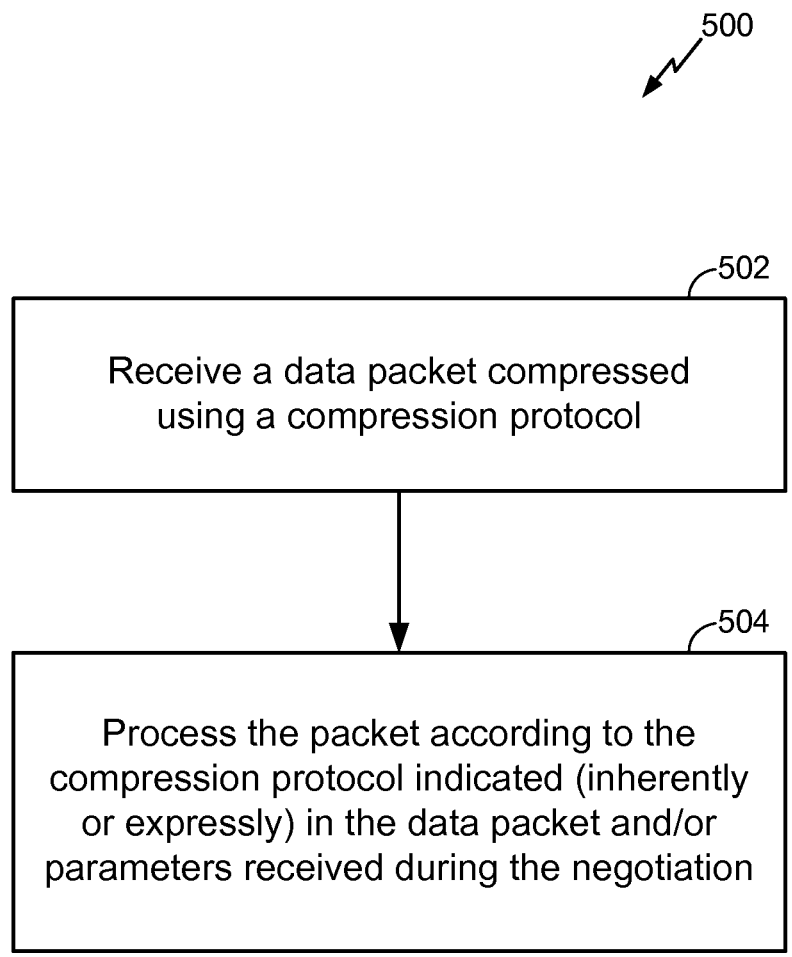
FIG. 5 illustrates an aspect of a method for communicating data packets having compressed headers using a compression protocol.

FIG. 5 illustrates an aspect of a method 500 for communicating data packets having compressed headers using a compression protocol. Although the method 500 is described below with respect to elements of the wireless device 202r, those having ordinary skill in the art will appreciate that other components may be used to implement one or more of the steps described herein.

At block 502, a wireless communication comprising the packet is received at the wireless device 202r after negotiation of a compression protocol.

Subsequently, at block 504, the data packet is processed according to the compression protocol indicated (inherently or expressly) in the data packet and/or parameters received during the negotiation.

Figure 6:
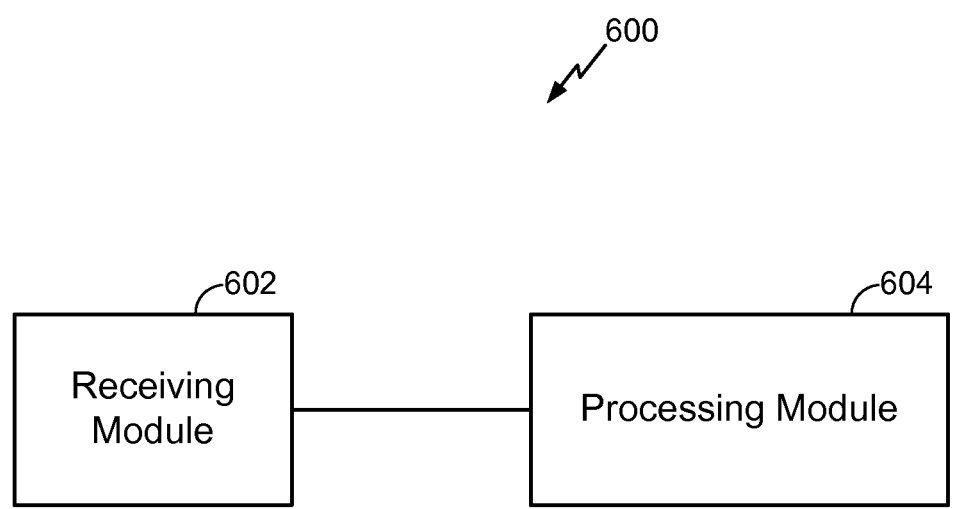
FIG. 6 is a functional block diagram of another exemplary wireless device that may be employed within the wireless communication system.

FIG. 6 is a functional block diagram of another exemplary wireless device 600 that may be employed within the wireless communication system 100. The device 600 comprises a receiving module 602 for wirelessly receiving a data packet. In some aspects, the packet is compressed using a compression protocol. The receiving module 602 may be configured to perform one or more of the functions discussed above with respect to the block 502 illustrated in FIG. 5. The receiving module 602 may correspond to the receiver 212. The device 600 further comprises a processing module 604 for processing the packet according to the compression protocol indicated (inherently or expressly) in the data packet and/or parameters received during the negotiation. The processing module 604 may be configured to perform one or more of the functions discussed above with respect to the block 504 illustrated in FIG. 5. The processing module 604 may correspond to one or more of the processor 204, the signal detector 218, and the DSP 220.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of communicating in a wireless network, the method comprising:
    selecting, at a first apparatus, at least one compression protocol from a plurality of compression protocols to use for compressing a first header in a first layer of a data packet communicated between the first apparatus and a second apparatus;
    transmitting information indicative of the at least one compression protocol from the first apparatus to the second apparatus, the information included in a second header in a second layer above the first layer of the data packet, wherein the second layer comprises a layer above a media access control layer; and
    transmitting the data packet, the first header in the first layer of the data packet compressed based on the at least one compression protocol, from the first apparatus to the second apparatus.

2. The method of claim 1, further comprising receiving, from the second apparatus, a response message indicating receipt of the information.

3. The method of claim 1, wherein the information indicative of the at least one compression protocol is included in a link logic control header.

4. The method of claim 1, further comprising selecting a first compression protocol to use for compressing a first header of a data packet communicated between the first apparatus and the second apparatus as part of a first flow, and selecting a second compression protocol to use for compressing a third header of a data packet communicated between the first apparatus and the second apparatus as part of a second flow.

5. The method of claim 1, further comprising transmitting a data packet with a first header compressed using a first compression protocol from the first apparatus to the second apparatus, and receiving a data packet with a third header compressed using a second compression protocol at the first apparatus from the second apparatus.

6. The method of claim 1, further comprising transmitting parameters of an uncompressed header from the first apparatus to the second apparatus as part of a negotiation, and wherein the data packets are transmitted subsequent to the negotiation, the data packets comprising compressed headers that do not include the parameters, and wherein the data packets are decodable based on the combination of the parameters and the compressed headers.

7. A first apparatus for communicating in a wireless network, the first apparatus comprising:
   a processor configured to select at least one compression protocol from a plurality of compression protocols to use for compressing a first header in a first layer of a data packet communicated between the first apparatus and a second apparatus; and
   a transmitter configured to:
      transmit information indicative of the at least one compression protocol to the second apparatus, the information included in a second header in a second layer above the first layer of the data packet, wherein the second layer comprises a layer above a media access control layer; and
      transmit the data packet, the first header in the first layer of the data packet compressed based on the at least one compression protocol, to the second apparatus.

8. The first apparatus of claim 7, further comprising a receiver configured to receive, from the second apparatus, a response message indicating receipt of the information.

9. The first apparatus of claim 7, wherein the information indicative of the at least one compression protocol is included in a link logic control header.

10. The first apparatus of claim 7, wherein the processor is further configured to select a first compression protocol to use for compressing a first header of a data packet communicated between the first apparatus and the second apparatus as part of a first flow, and select a second compression protocol to use for compressing a third header of a data packet communicated between the first apparatus and the second apparatus as part of a second flow.

11. The first apparatus of claim 7, wherein the transmitter is further configured to transmit a data packet with a first header compressed using a first compression protocol from the first apparatus to the second apparatus, and further comprising a receiver configured to receive a data packet with a third header compressed using a second compression protocol at the first apparatus from the second apparatus.

12. The first apparatus of claim 7, wherein the transmitter is further configured to transmit parameters of an uncompressed header from the first apparatus to the second apparatus as part of a negotiation, and wherein the data packets are transmitted subsequent to the negotiation, the data packets comprising compressed headers that do not include the parameters, and wherein the data packets are decodable based on the combination of the parameters and the compressed headers.

13. A first apparatus for communicating in a wireless network, the first apparatus comprising:
   means for selecting at least one compression protocol from a plurality of compression protocols to use for compressing a first header in a first layer of a data packet communicated between the first apparatus and a second apparatus;
   means for transmitting information indicative of the at least one compression protocol from the first apparatus to the second apparatus, the information included a second header in a second layer above the first layer of the data packet, wherein the second layer comprises a layer above a media access control layer; and
   means for transmitting the data packet, the first header in the first layer of the data packet compressed based on the at least one compression protocol, from the first apparatus to the second apparatus.

14. The first apparatus of claim 13, further comprising means for receiving, from the second apparatus, a response message indicating receipt of the information.

15. The first apparatus of claim 13, wherein the information indicative of the at least one compression protocol is included in a link logic control header.

16. The first apparatus of claim 13, further comprising means for selecting a first compression protocol to use for compressing a first header of a data packet communicated between the first apparatus and the second apparatus as part of a first flow, and means for selecting a second compression protocol to use for compressing a third header of a data packet communicated between the first apparatus and the second apparatus as part of a second flow.

17. The first apparatus of claim 13, further comprising means for transmitting a data packet with a first header compressed using a first compression protocol from the first apparatus to the second apparatus, and means for receiving a data packet with a third header compressed using a second compression protocol at the first apparatus from the second apparatus.

18. The first apparatus of claim 13, further comprising means for transmitting parameters of an uncompressed header from the first apparatus to the second apparatus as part of a negotiation, and wherein the data packets are transmitted subsequent to the negotiation, the data packets comprising compressed headers that do not include the parameters, and wherein the data packets are decodable based on the combination of the parameters and the compressed headers.

19. A non-transitory computer readable medium comprising instructions that when executed cause a first apparatus to:
   select, at the first apparatus, at least one compression protocol from a plurality of compression protocols to use for compressing a first header in a first layer of a data packet communicated between the first apparatus and a second apparatus;
   transmit information indicative of the at least one compression protocol from the first apparatus to the second apparatus, the information included in a second header in a second layer above the first layer of the data packet, wherein the second layer comprises a layer above a media access control layer; and
   transmit the data packet, the first header in the first layer of the data packet compressed based on the at least one compression protocol, from the first apparatus to the second apparatus.

20. The non-transitory computer readable medium of claim 19, wherein the instructions when executed further cause the first apparatus to receive, from the second apparatus, a response message indicating receipt of the information.

21. The non-transitory computer readable medium of claim 19, wherein the information indicative of the at least one compression protocol is included in a link logic control header.

22. The non-transitory computer readable medium of claim 19, wherein the instructions when executed further cause the first apparatus to select a first compression protocol to use for compressing a first header of a data packet communicated between the first apparatus and the second apparatus as part of a first flow, and select a second compression protocol to use for compressing a third header of a data packet communicated between the first apparatus and the second apparatus as part of a second flow.

23. The non-transitory computer readable medium of claim 19, wherein the instructions when executed further cause the first apparatus to transmit a data packet with a first header compressed using a first compression protocol from the first apparatus to the second apparatus, and wherein the instructions when executed further cause the first apparatus to receive a data packet with a third header compressed using a second compression protocol at the first apparatus from the second apparatus.

24. The non-transitory computer readable medium of claim 19, wherein the instructions when executed further cause the first apparatus to transmit parameters of an uncompressed header from the first apparatus to the second apparatus as part of a negotiation, and wherein the data packets are transmitted subsequent to the negotiation, the data packets comprising compressed headers that do not include the parameters, and wherein the data packets are decodable based on the combination of the parameters and the compressed headers.

25. The method of claim 1, wherein the information indicative of the at least one compression protocol is further indicative of parameters of the at least one compression protocol.

26. The method of claim 25, wherein the information indicative of the at least one compression protocol is further indicative of first header fields compressed by the at least one compression protocol and first header fields not compressed by the at least one compression protocol.

* * * * *